(12) United States Patent
Shoji et al.

(10) Patent No.: US 12,485,964 B2
(45) Date of Patent: Dec. 2, 2025

(54) MOTOR CONTROL DEVICE

(71) Applicant: JTEKT CORPORATION, Kariya (JP)

(72) Inventors: Naoki Shoji, Shiki-gun (JP); Hidenori Itamoto, Tajima (JP); Terutaka Tamaizumi, Okazaki (JP); Hiromasa Tamaki, Okazaki (JP); Shingo Nitta, Anjo (JP); Xin Zhou, Kiyosu (JP); Shunsuke Tsujii, Okazaki (JP)

(73) Assignee: JTEKT CORPORATION, Kariya (JP)

( * ) Notice: Subject to any disclaimer, the term of this patent is extended or adjusted under 35 U.S.C. 154(b) by 61 days.

(21) Appl. No.: 18/713,764

(22) PCT Filed: Dec. 3, 2021

(86) PCT No.: PCT/JP2021/044533
§ 371 (c)(1),
(2) Date: May 28, 2024

(87) PCT Pub. No.: WO2023/100369
PCT Pub. Date: Jun. 8, 2023

(65) Prior Publication Data
US 2025/0058828 A1 Feb. 20, 2025

(51) Int. Cl.
*B62D 15/02* (2006.01)
*B62D 5/04* (2006.01)

(52) U.S. Cl.
CPC ........... *B62D 15/024* (2013.01); *B62D 5/046* (2013.01)

(58) Field of Classification Search
CPC ...... B62D 15/024; B62D 5/046; B62D 6/007; B62D 6/008; B62D 15/025
See application file for complete search history.

(56) References Cited

U.S. PATENT DOCUMENTS 6,176,341 B1 * 1/2001 Ansari ................... B62D 6/008
                                                              180/402
6,554,094 B1 * 4/2003 Bell ..................... B62D 5/0418
                                                              152/416

(Continued)

FOREIGN PATENT DOCUMENTS

EP          3 608 203 B1     5/2021
JP          2002-104210 A    4/2002
(Continued)

OTHER PUBLICATIONS

May 2, 2024 International Preliminary Report on Patentabiilty issued in International Patent Application No. PCT/JP2021/044533.
(Continued)

*Primary Examiner* — Joseph J Dallo
(74) *Attorney, Agent, or Firm* — Oliff PLC

(57) ABSTRACT

A motor control device includes a manual steering command value generation unit that generates a manual steering command value, and a hands-on/off determination unit that determines whether a driver is in a gripping state in which the driver is gripping a steering wheel or in a released state in which the driver is not gripping the steering wheel. The manual steering command value generation unit is configured to generate the manual steering command value based on an equation of motion. The motor control device further includes a coefficient value changing unit that changes a value of at least one coefficient among coefficients included in the equation of motion based on a determination result from the hands-on/off determination unit.

3 Claims, 9 Drawing Sheets

(56) References Cited

U.S. PATENT DOCUMENTS

| | | | | |
|---|---|---|---|---|
| 7,191,864 | B2* | 3/2007 | Sugitani | B62D 6/008 |
| | | | | 180/402 |
| 7,249,650 | B2* | 7/2007 | Fukushima | B62D 5/006 |
| | | | | 701/41 |
| 11,845,500 | B2* | 12/2023 | Shoji | B62D 5/0463 |
| 2017/0183032 | A1 | 6/2017 | Wilhelm et al. | |
| 2019/0009816 | A1 | 1/2019 | Moreillon et al. | |
| 2019/0126981 | A1 | 5/2019 | Goering et al. | |
| 2019/0248412 | A1 | 8/2019 | Wilhelm et al. | |
| 2019/0329818 | A1 | 10/2019 | Shoji et al. | |
| 2020/0108853 | A1 | 4/2020 | Moreillon et al. | |
| 2020/0108858 | A1 | 4/2020 | Moreillon et al. | |
| 2020/0269906 | A1* | 8/2020 | Nakade | B62D 5/0463 |
| 2021/0031827 | A1* | 2/2021 | Karve | B62D 5/0472 |
| 2021/0269086 | A1* | 9/2021 | Anraku | B62D 5/0481 |

FOREIGN PATENT DOCUMENTS

| | | |
|---|---|---|
| JP | 2005-088860 A | 4/2005 |
| JP | 2017-114324 A | 6/2017 |
| JP | 2018-165156 A | 10/2018 |
| JP | 2019-014468 A | 1/2019 |
| JP | 2019-194059 A | 11/2019 |
| JP | 2020-059361 A | 4/2020 |
| JP | 2020-059362 A | 4/2020 |
| JP | 2020-132008 A | 8/2020 |
| JP | 2020-142703 A | 9/2020 |
| JP | 2023048867 A * | 4/2023 |
| WO | WO-2023100369 A1 * | 6/2023 ............. B62D 5/046 |

OTHER PUBLICATIONS

Feb. 8, 2022 Search Report issued in International Patent Application No. PCT/JP2021/044533.

Nov. 11, 2024 Extended Search Report issued in European Patent Application No. 21966448.9.

* cited by examiner

MOTOR CONTROL DEVICE

TECHNICAL FIELD

The present invention relates to a motor control device that controls an electric motor for steering angle control.

BACKGROUND ART

Patent Document 1 below discloses a motor control device including: a manual steering command value calculation unit that calculates a manual steering command value using steering torque; an integrated angle command value calculation unit that calculates an integrated angle command value by adding the manual steering command value to an automatic steering command value; and a control unit that performs angle control on an electric motor based on the integrated angle command value.

The manual steering command value calculation unit of Patent Document 1 calculates the manual steering command value using a reference EPS model. Specifically, the manual steering command value calculation unit calculates the manual steering command value based on an equation of motion including, as coefficients, a spring constant and a viscous damping coefficient for giving a virtual reaction force. It is considered that the spring constant and the viscous damping coefficient are designed so that an appropriate steering reaction force is generated when a driver intervenes in steering.

RELATED ART DOCUMENTS

Patent Documents

Patent Document 1: Japanese Unexamined Patent Application Publication No. 2019-194059 (JP 2019-194059 A)

SUMMARY OF THE INVENTION

Problem to be Solved by the Invention

In the motor control device described in Patent Document 1, it is possible to design the reaction force characteristic when the driver intervenes in steering, but the return characteristic (characteristic that the manual steering command value converges on zero) when the driver releases the steering wheel after the steering intervention and returns to autonomous driving depends on circumstances. In other words, when returning to the autonomous driving, the manual steering command value converges on zero due to the characteristic designed for the steering reaction force at the time of steering intervention.

When the spring constant and the viscous damping coefficient are designed with priority given to the return characteristic, the reaction force characteristic during the steering intervention depends on circumstances.

An object of an embodiment of the present invention is to provide a motor control device that can individually set a reaction force characteristic during steering intervention and a return characteristic after the steering intervention.

Means for Solving the Problem

An embodiment of the present invention provides a motor control device including: a manual steering command value generation unit that generates a manual steering command value; an integrated angle command value calculation unit that calculates an integrated angle command value by adding the manual steering command value to an automatic steering command value provided in an autonomous driving mode; a control unit that performs angle control on an electric motor for steering angle control based on the integrated angle command value; and a hands-on/off determination unit that determines whether a driver is in a gripping state in which the driver is gripping a steering wheel or in a released state in which the driver is not gripping the steering wheel. The manual steering command value generation unit is configured to generate the manual steering command value based on an equation of motion. The motor control device further includes a coefficient value changing unit that changes a value of at least one coefficient among coefficients included in the equation of motion based on a determination result from the hands-on/off determination unit.

With this configuration, it is possible to individually set the reaction force characteristic during the steering intervention and the return characteristic after the steering wheel is released.

MODES FOR CARRYING OUT THE INVENTION

Description of Embodiment of Invention

An embodiment of the present invention provides a motor control device including: a manual steering command value generation unit that generates a manual steering command value; an integrated angle command value calculation unit that calculates an integrated angle command value by adding the manual steering command value to an automatic steering command value provided in an autonomous driving mode; a control unit that performs angle control on an electric motor for steering angle control based on the integrated angle command value; and a hands-on/off determination unit that determines whether a driver is in a gripping state in which the driver is gripping a steering wheel or in a released state in which the driver is not gripping the steering wheel. The manual steering command value generation unit is configured to generate the manual steering command value based on an equation of motion. The motor control device further includes a coefficient value changing unit that changes a value of at least one coefficient among coefficients included in the equation of motion based on a determination result from the hands-on/off determination unit.

With this configuration, it is possible to individually set the reaction force characteristic during the steering intervention and the return characteristic after the steering wheel is released.

In the embodiment of the present invention, the equation of motion includes inertia, a spring constant, and a viscous damping coefficient as the coefficients, and the coefficient value changing unit is configured to change a value of at least one of the inertia, the spring constant, and the viscous damping coefficient based on the determination result from the hands-on/off determination unit.

In the embodiment of the present invention, the hands-on/off determination unit is configured to determine that the driver is in the gripping state when a steering torque is equal to or greater than a predetermined threshold value, and determine that the driver is in the released state when the steering torque continues to be smaller than the threshold value for a predetermined time or longer.

Detailed Description of Embodiment of Invention

An embodiment of the present invention will be described in detail below with reference to the accompanying drawings.

[1] Schematic Configuration of Electric Power Steering System

Figure 1:
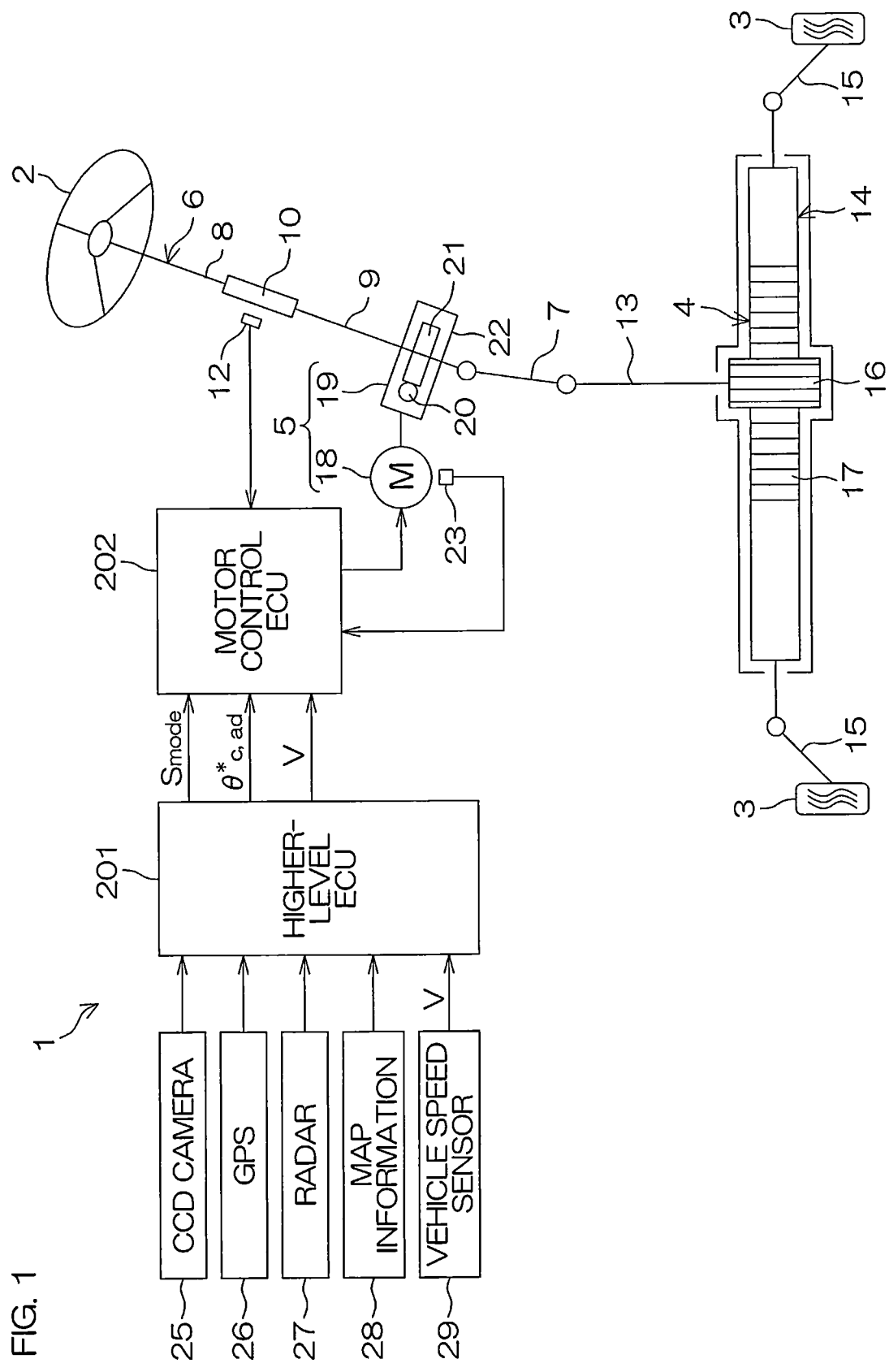
FIG. 1 is a schematic diagram showing a schematic configuration of an electric power steering system to which a motor control device according to an embodiment of the present invention is applied.

FIG. 1 is a schematic diagram showing a schematic configuration of an electric power steering system to which a motor control device according to an embodiment of the present invention is applied.

An electric power steering system 1 includes: a steering wheel 2 that is a steering member for steering a vehicle; a steering operation mechanism 4 that steers steered wheels 3 in conjunction with rotation of the steering wheel 2; and a steering assist mechanism 5 that assists a driver in steering. The steering wheel 2 and the steering operation mechanism 4 are mechanically connected via a steering shaft 6 and an intermediate shaft 7.

The steering shaft 6 includes an input shaft 8 connected to the steering wheel 2 and an output shaft 9 connected to the intermediate shaft 7. The input shaft 8 and the output shaft 9 are connected via a torsion bar 10 so as to be rotatable relative to each other.

A torque sensor 12 is disposed near the torsion bar 10. The torque sensor 12 detects steering torque (torsion bar torque) $T_{tb}$ applied to the steering wheel 2 based on the amount of relative rotational displacement between the input shaft 8 and the output shaft 9. In the present embodiment, the steering torque $T_{tb}$ that is detected by the torque sensor 12 is such that, for example, the torque for steering to the left is detected as a positive value and the torque for steering to the right is detected as a negative value. It is herein assumed that the magnitude of the steering torque $T_{tb}$ increases as the absolute value thereof increases.

The steering operation mechanism 4 is a rack and pinion mechanism including a pinion shaft 13 and a rack shaft 14 that is a steered shaft. The steered wheels 3 are connected to the ends of the rack shaft 14 via tie rods 15 and knuckle arms (not shown). The pinion shaft 13 is connected to the intermediate shaft 7. The pinion shaft 13 is configured to rotate in conjunction with steering of the steering wheel 2. A pinion 16 is connected to a distal end of the pinion shaft 13.

The rack shaft 14 extends linearly along the right-left direction of the vehicle. A rack 17 that meshes with the pinion 16 is formed on an intermediate portion of the rack shaft 14 in the axial direction. The pinion 16 and the rack 17 convert rotation of the pinion shaft 13 into axial movement of the rack shaft 14. The steered wheels 3 can be steered by moving the rack shaft 14 in the axial direction.

When the steering wheel 2 is steered (rotated), this rotation is transmitted to the pinion shaft 13 via the steering shaft 6 and the intermediate shaft 7. The pinion 16 and the rack 17 convert rotation of the pinion shaft 13 into axial movement of the rack shaft 14. The steered wheels 3 are thus steered.

The steering assist mechanism 5 includes an electric motor 18 that generates a steering assist force (assist torque), and a speed reducer 19 that amplifies output torque of the electric motor 18 and transmits the amplified torque to the steering operation mechanism 4. The speed reducer 19 is a worm gear mechanism including a worm gear 20 and a worm wheel 21 that meshes with the worm gear 20. The speed reducer 19 is housed in a gear housing 22 that is a transmission mechanism housing. Hereinafter, the reduction ratio (gear ratio) of the speed reducer 19 may be represented by N. The reduction ratio N is defined as a ratio $\theta_{wg}/\theta_{ww}$ of a rotational angle $\theta_{wg}$ of the worm gear 20 to a rotational angle $\theta_{ww}$ of the worm wheel 21.

The worm gear 20 is rotationally driven by the electric motor 18. The worm wheel 21 is connected to the output shaft 9 so as to be rotatable together.

When the worm gear 20 is rotationally driven by the electric motor 18, the worm wheel 21 is rotationally driven so that motor torque is applied to the steering shaft 6 and the steering shaft 6 (output shaft 9) is rotated. The rotation of the steering shaft 6 is transmitted to the pinion shaft 13 via the intermediate shaft 7. Rotation of the pinion shaft 13 is converted into axial movement of the rack shaft 14. The steered wheels 3 are thus steered. That is, rotationally driving the worm gear 20 using the electric motor 18 enables steering assist by the electric motor 18 and steering of the steered wheels 3. The electric motor 18 is provided with a rotational angle sensor 23 for detecting the rotational angle of a rotor of the electric motor 18.

The torque that is applied to the output shaft 9 (example of an object to be driven by the electric motor 18) includes motor torque from the electric motor 18 and disturbance torque other than the motor torque. A disturbance torque $T_{lc}$ other than the motor torque includes steering torque $T_{tb}$, road load torque (road reaction torque) $T_{rl}$, and friction torque $T_f$.

The steering torque $T_{tb}$ is torque that is applied from the steering wheel 2 side to the output shaft 9 due to a force that is applied to the steering wheel 2 by the driver (driver torque), a force that is generated by steering inertia, etc.

The road load torque $T_{rl}$ is torque that is applied from the steered wheel 3 side to the output shaft 9 via the rack shaft 14 due to self-aligning torque that is generated by a tire, a force that is generated by a suspension and tire wheel alignment, a friction force of the rack and pinion mechanism, etc.

The vehicle is equipped with a CCD (Charge Coupled Device) camera 25 that captures an image of the road ahead in the direction of travel of the vehicle, a GPS (Global Positioning System) 26 that detects the position of the vehicle, a radar 27 that detects a road shape and obstacles, a map information memory 28 that stores map information, and a vehicle speed sensor 29 that detects a vehicle speed V.

The CCD camera 25, the GPS 26, the radar 27, the map information memory 28, and the vehicle speed sensor 29 are connected to a higher-level ECU (ECU: Electronic Control Unit) 201 that performs autonomous driving control. The higher-level ECU 201 performs surrounding environment recognition, vehicle position estimation, route planning, etc. based on information obtained by the CCD camera 25, the GPS 26, the radar 27, and the vehicle speed sensor 29 and the map information, and determines control target values for steering and drive actuators.

In the present embodiment, the driving mode includes a normal mode and an autonomous driving mode. The higher-level ECU 201 sets an automatic steering command value $\theta^*_{c,ad}$ for autonomous driving (including driving assist) in the autonomous driving mode. In the present embodiment, autonomous driving control is control for causing the vehicle to travel along a target travel route. The automatic steering command value $\theta^*_{c,ad}$ is a target value of the steering angle for causing the vehicle to travel along the target travel route. A process of setting such an automatic steering command value $\theta^*_{c,ad}$ is well known, and therefore will not be described in detail herein. In the normal mode, the higher-level ECU 201 sets the automatic steering command value $\theta^*_{c,ad}$ to zero.

The higher-level ECU 201 outputs a mode signal $S_{mode}$ indicating whether the driving mode is the normal mode or the autonomous driving mode. The mode signal $S_{mode}$, the automatic steering command value $\theta^*_{c,ad}$ set by the higher-level ECU 201, and the vehicle speed V are provided to a motor control ECU 202 via an in-vehicle network. The steering torque $T_{tb}$ detected by the torque sensor 12 and an output signal from the rotational angle sensor 23 are input to the motor control ECU 202. The motor control ECU 202 controls the electric motor 18 based on these input signals and information provided from the higher-level ECU 201.

[2] Motor Control ECU 202

Figure 2:
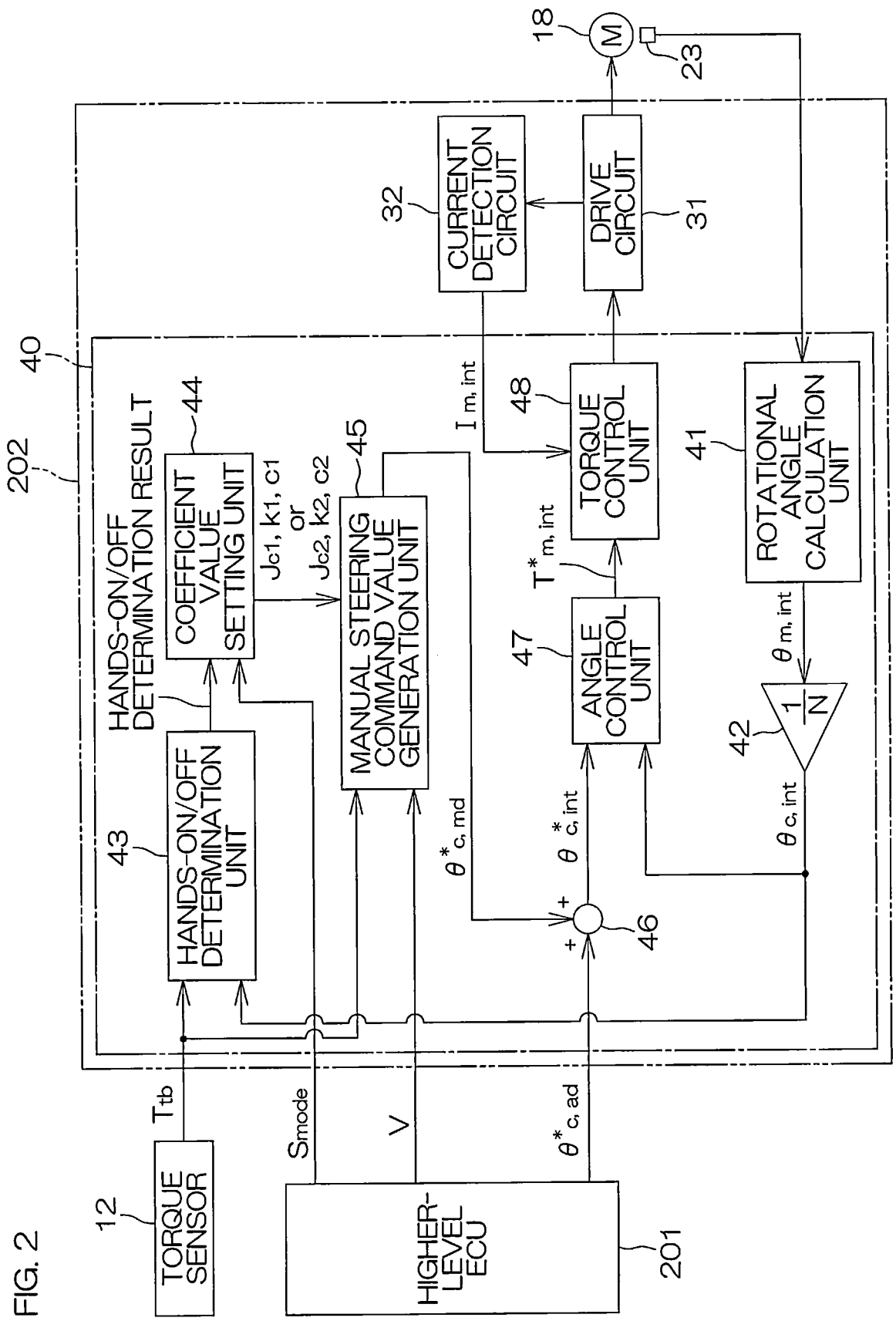
FIG. 2 is a block diagram illustrating an electrical configuration of a motor control ECU.

FIG. 2 is a block diagram illustrating an electrical configuration of the motor control ECU 202.

The motor control ECU 202 includes a microcomputer 40, a drive circuit (inverter circuit) 31 that is controlled by the microcomputer 40 and supplies electric power to the electric motor 18, and a current detection circuit 32 that detects a current (hereinafter referred to as "motor current $I_{m,int}$") that flows through the electric motor 18.

The microcomputer 40 includes a CPU and a memory (such as a ROM, a RAM, and a non-volatile memory), and functions as a plurality of functional processing units by executing a predetermined program. The plurality of functional processing units includes a rotational angle calculation unit 41, a reduction ratio division unit 42, a hands-on/off determination unit 43, a coefficient value setting unit 44, a manual steering command value generation unit 45, an integrated angle command value calculation unit 46, an angle control unit 47, and a torque control unit 48.

The rotational angle calculation unit 41 calculates a rotor rotational angle $\theta_{m,int}$ of the electric motor 18 based on an output signal from the rotational angle sensor 23. The reduction ratio division unit 42 converts the rotor rotational angle $\theta_{m,int}$ into a rotational angle (actual steering angle) $\theta_{c,int}$ of the output shaft 9 by dividing the rotor rotational angle $\theta_{m,int}$ by the reduction ratio N.

The hands-on/off determination unit 43 determines whether the driver is in a gripping state (hands-on) in which the driver is gripping the steering wheel 2 or in a released state (hands-off) in which the driver is not gripping the steering wheel 2. For example, the hands-on/off determination unit 43 may estimate driver torque that is torque applied to the steering wheel 2 by the driver based on the steering torque $T_{tb}$ and the actual steering angle $\theta_{c,int}$ or the rotor rotational angle $\theta_{m,int}$, determine that the driver is in the gripping state when the driver torque is equal to or greater than a predetermined threshold value, and determine that the driver is in the released state when the driver torque continues to be smaller than the threshold value for a predetermined time or longer. In this case, determination is made that the driver is in the gripping state until determination is made that the driver is in the released state after the driver torque has changed from a value equal to or greater than the threshold value to a value smaller than the threshold value. Examples of such a hands-on/off determination unit 43 may include "steering wheel operation state determination units" described in Japanese Unexamined Patent Application Publication Nos. 2017-114324 (JP 2017-114324 A), 2018-165156 (JP 2018-165156 A), 2020-142703 (JP 2020-142703 A), 2020-59361 (JP 2020-59361 A), and 2020-59362 (JP 2020-59362 A).

For example, the hands-on/off determination unit 43 may determine that the driver is in the gripping state when the steering torque $T_{tb}$ is equal to or greater than a predetermined threshold value, and determine that the driver is in the released state when the steering torque $T_{tb}$ continues to be smaller than the threshold value for a predetermined time or longer. In this case, determination is made that the driver is in the gripping state until determination is made that the driver is in the released state after the steering torque $T_{tb}$ has changed from a value equal to or greater than the threshold value to a value smaller than the threshold value. The hands-on/off determination unit 43 may be a hands-on/off determination unit having such a hysteresis characteristic as to determine hands-on when the steering torque $T_{tb}$ is equal to or greater than a first threshold value (e.g., 1 Nm) and determine hands-off when the steering torque $T_{tb}$ is equal to or smaller than a second threshold value (e.g., 0.5 Nm) different from the first threshold value.

The coefficient value setting unit 44 sets a lower column inertia $J_c$, a spring constant k, and a viscous damping coefficient c to be used by the manual steering command value generation unit 45 in the autonomous driving mode based on a hands-on/off determination result from the hands-on/off determination unit 43.

The manual steering command value generation unit 45 is provided to, when the driver operates the steering wheel 2, set the steering angle that matches the steering wheel operation as a manual steering command value $\theta^*_{c,md}$. The manual steering command value generation unit 45 generates the manual steering command value $\theta^*_{c,md}$ using the vehicle speed V and the steering torque $T_{tb}$ detected by the torque sensor 12. The operation of the manual steering command value generation unit 45 will be described in detail later.

The integrated angle command value calculation unit 46 calculates an integrated angle command value $\theta^*_{c,int}$ by adding the manual steering command value $\theta^*_{c,md}$ to the automatic steering command value $\theta^*_{c,ad}$ set by the higher-level ECU 201.

The angle control unit 47 calculates a motor torque command value $T^*_{m,int}$ that is a target value of the motor torque of the electric motor 18 based on the integrated angle command value $\theta^*_{c,int}$. The torque control unit 48 drives the drive circuit 31 so that the motor torque of the electric motor 18 is brought closer to the motor torque command value $T^*_{m,int}$. That is, the control unit including the angle control unit 47 and the torque control unit 48 controls the drive of the drive circuit 31 so that the actual steering angle $\theta_{c,int}$ (rotational angle $\theta_{c,int}$ of the output shaft 9) is brought closer to the integrated angle command value $\theta^*_{c,int}$. The operations of the angle control unit 47 and the torque control unit 48 will be described in detail later.

Figure 3:
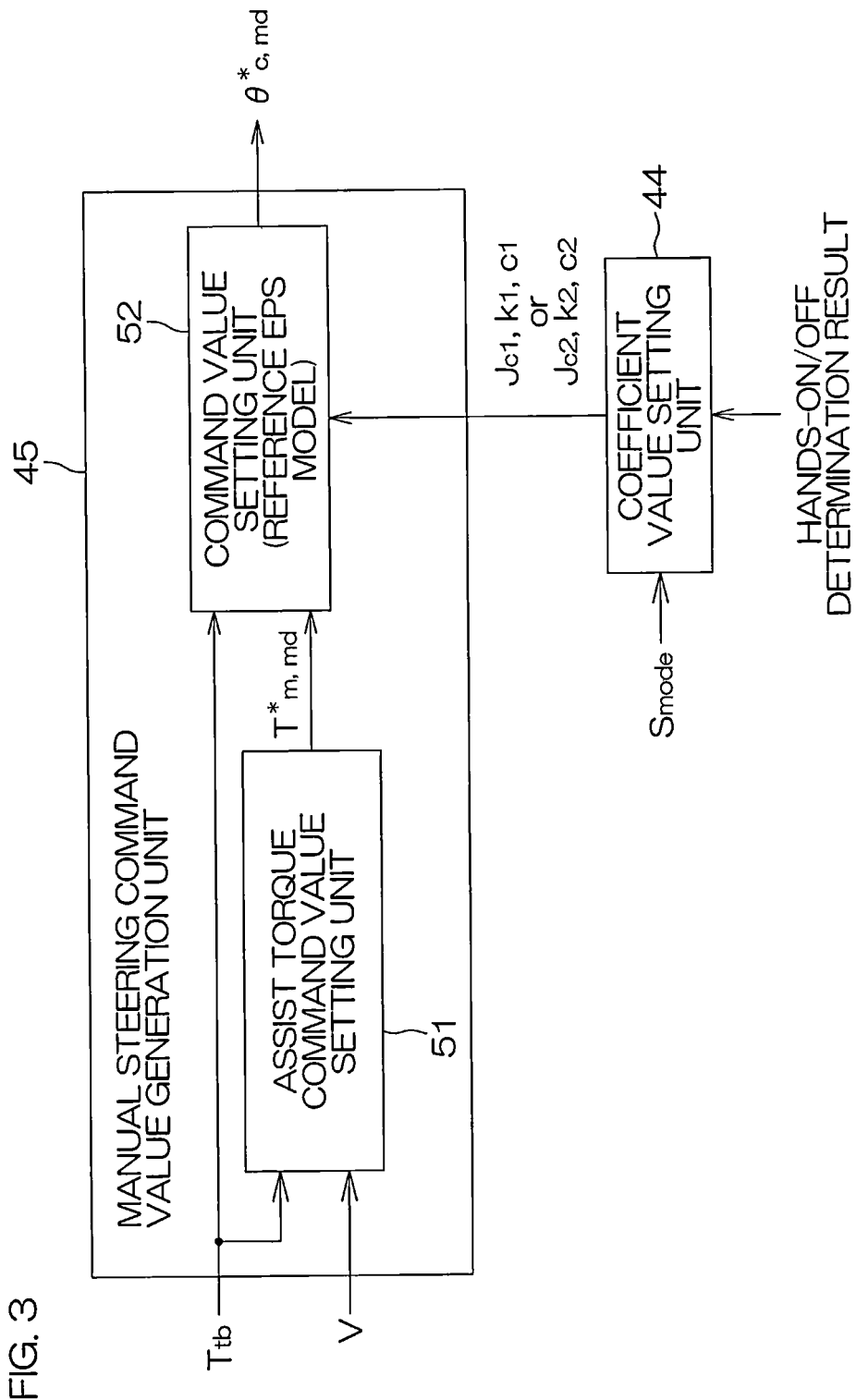
FIG. 3 is a block diagram showing the configuration of a manual steering command value generation unit.

FIG. 3 is a block diagram showing the configuration of the manual steering command value generation unit 45.

The manual steering command value generation unit 45 includes an assist torque command value setting unit 51 and a command value setting unit 52.

Figure 4:
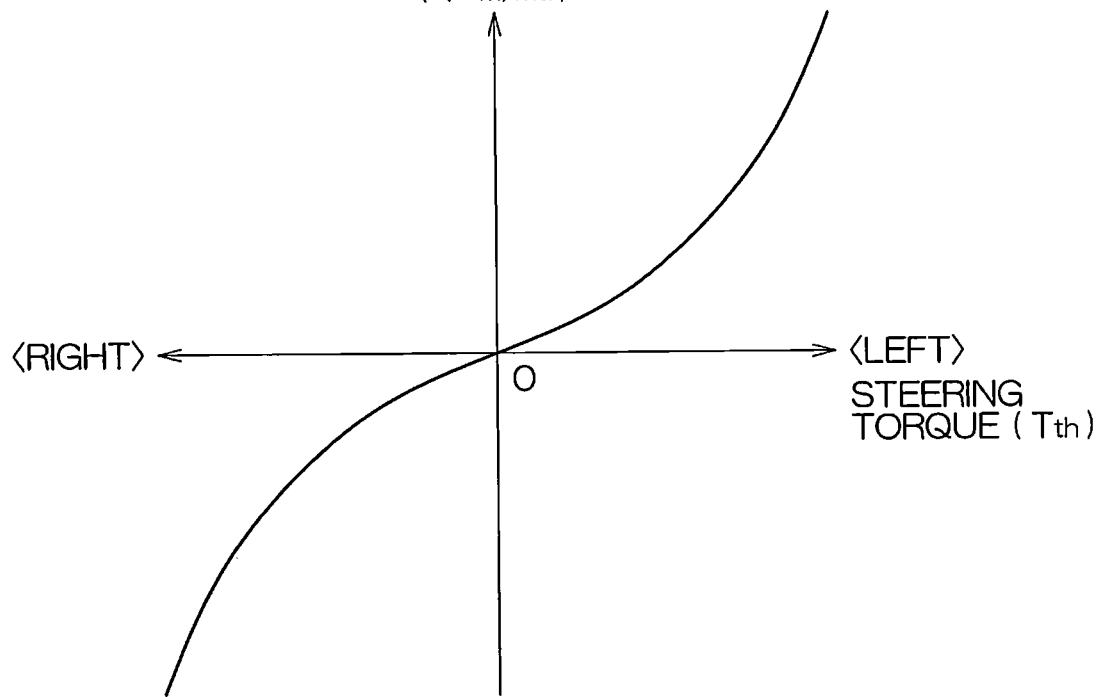
FIG. 4 is a graph showing an example of setting an assist torque command value $T^*_{m,ad}$ with respect to steering torque $T_{tb}$.

The assist torque command value setting unit 51 sets an assist torque command value $T^*_{m,md}$ that is a target value of the assist torque necessary for a manual operation. The assist torque command value setting unit 51 sets the assist torque command value $T^*_{m,md}$ based on the vehicle speed V and the steering torque $T_{tb}$ detected by the torque sensor 12. An example of setting the assist torque command value $T^*_{m,md}$ with respect to the steering torque $T_{tb}$ is shown in FIG. 4.

The assist torque command value $T^*_{m,md}$ is set to a positive value when the electric motor 18 should generate a steering assist force for steering to the left, and is set to a negative value when the electric motor 18 should generate a steering assist force for steering to the right. The assist torque command value $T^*_{m,md}$ is positive for a positive value of the steering torque $T_{tb}$, and is negative for a negative value of the steering torque $T_{tb}$. The assist torque command value $T^*_{m,md}$ is set so that its absolute value increases as the absolute value of the steering torque $T_{tb}$ increases. The assist torque command value $T^*_{m,md}$ is set so that its absolute value decreases as the vehicle speed V increases.

The assist torque command value setting unit 51 may calculate the assist torque command value $T^*_{m,md}$ by multiplying the steering torque $T_{tb}$ by a preset constant.

In the present embodiment, the command value setting unit 52 uses a reference EPS model to set the manual steering command value $\theta^*_{c,md}$.

Figure 5:
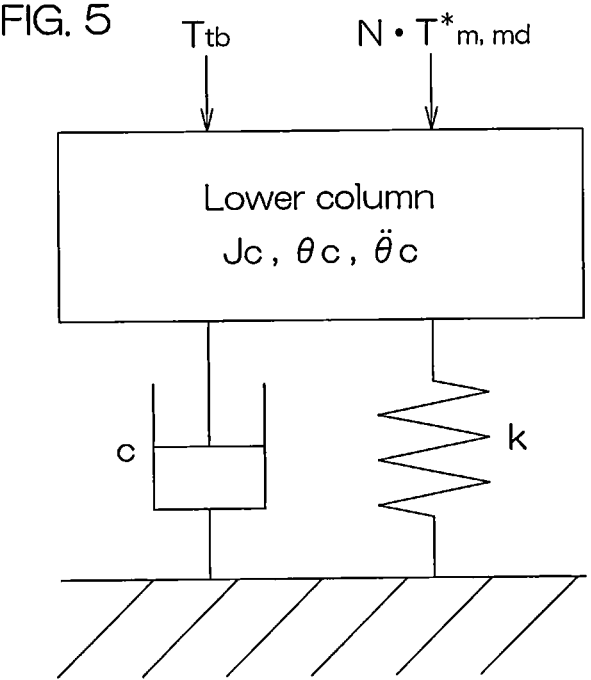
FIG. 5 is a schematic diagram showing an example of a reference EPS model that is used in a command value setting unit.

FIG. 5 is a schematic diagram showing an example of the reference EPS model that is used in the command value setting unit 52.

This reference EPS model is a single inertia model including a lower column. The lower column corresponds to the output shaft 9 and the worm wheel 21. In FIG. 5, $J_c$ is the inertia of the lower column, $\theta_c$ is the rotational angle of the lower column, and $T_{tb}$ is the steering torque. This reference EPS model is a model for generating (estimating) the rotational angle $\theta_c$ of the lower column when the steering torque $T_{tb}$, an output shaft torque command value $N \cdot T^*_{m,md}$ that acts on the output shaft 9 from the electric motor 18 based on the assist torque command value $T^*_{m,md}$, and the road load torque $T_{rl}$ are provided to the lower column. The road load torque $T_{rl}$ is given by the following expression (1) using the spring constant k and the viscous damping coefficient c.

$$T_{rl} = -k \cdot \theta_c - c(d\theta_c/dt) \quad (1)$$

An equation of motion of the reference EPS model is given by the following expression (2).

$$J_c \cdot d^2\theta_c/dt^2 = T_{tb} + N \cdot T^*_{m,md} - k \cdot \theta_c - c(d\theta_c/dt) \quad (2)$$

The values of the lower column inertia $J_c$, the spring constant k, and the viscous damping coefficient c that are coefficients of the equation of motion in the expression (2) are set by the coefficient value setting unit 44. The operation of the coefficient value setting unit 44 will be described in detail later.

The command value setting unit 52 calculates the rotational angle $\theta_c$ of the lower column by solving the differential equation represented by the expression (2) by substituting the steering torque $T_{tb}$ detected by the torque sensor 12 for $T_{tb}$ and substituting the assist torque command value $T^*_{m,md}$ set by the assist torque command value setting unit 51 for $T^*_{m,md}$. The command value setting unit 52 sets the obtained rotational angle $\theta_c$ of the lower column as the manual steering command value $\theta^*_{c,md}$.

Figure 6:
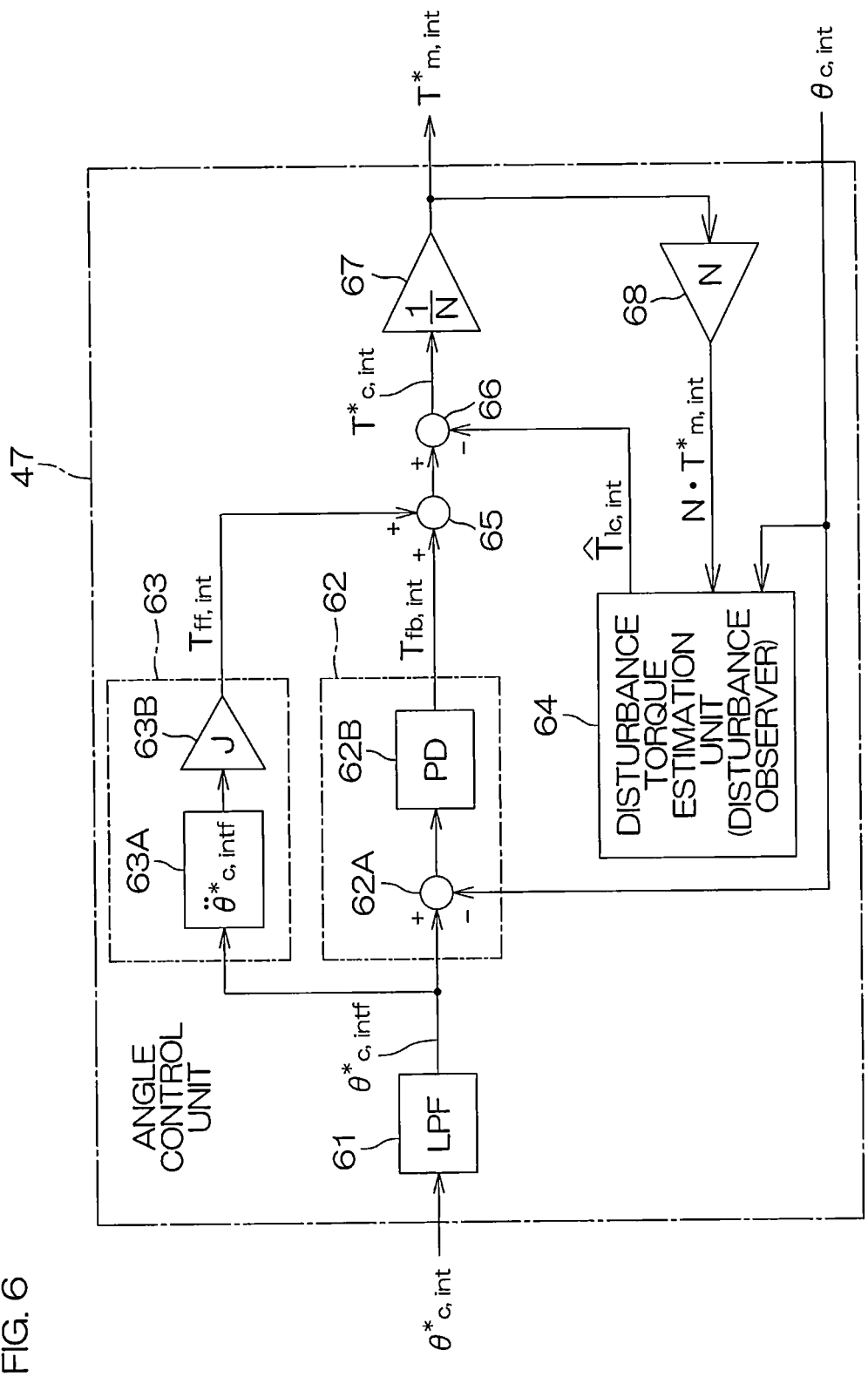
FIG. 6 is a block diagram showing the configuration of an angle control unit.

FIG. 6 is a block diagram showing the configuration of the angle control unit 47.

The angle control unit 47 calculates the motor torque command value $T^*_{m,int}$ based on the integrated angle command value $\theta^*_{c,int}$. The angle control unit 47 includes a low-pass filter (LPF) 61, a feedback control unit 62, a feedforward control unit 63, a disturbance torque estimation unit 64, a torque addition unit 65, a disturbance torque compensation unit 66, a reduction ratio division unit 67, and a reduction ratio multiplication unit 68.

The reduction ratio multiplication unit 68 converts the motor torque command value $T^*_{m,int}$ calculated by the reduction ratio division unit 67 into an output shaft torque command value $T^*_{c,int}$ ($N \cdot T^*_{m,int}$) that acts on the output shaft 9 by multiplying the motor torque command value $T^*_{m,int}$ by the reduction ratio N of the speed reducer 19.

The low-pass filter 61 performs a low-pass filtering process on the integrated angle command value $\theta^*_{c,int}$. An integrated angle command value $\theta^*_{c,intf}$ after the low-pass filtering process is provided to the feedback control unit 62 and the feedforward control unit 63.

The feedback control unit 62 is provided to bring the actual steering angle $\theta_{c,int}$ calculated by the reduction ratio division unit 42 (see FIG. 2) closer to the integrated angle command value $\theta^*_{c,intf}$ after the low-pass filtering process. The feedback control unit 62 includes an angle deviation calculation unit 62A and a PD control unit 62B. The angle deviation calculation unit 62A calculates a deviation $\Delta\theta_{c,int}$ ($=\theta^*_{c,intf} - \theta_{c,int}$) between the integrated angle command value $\theta^*_{c,intf}$ and the actual steering angle $\theta_{c,int}$ calculated by the reduction ratio division unit 42. The angle deviation calculation unit 62A may calculate, as the angle deviation $\Delta\theta_{c,int}$, a deviation ($\theta^*c,intr - \hat{\theta}_{c,int}$) between the integrated angle command value $\theta^*_{c,intf}$ and an estimated steering angle value $\hat{\theta}_{c,int}$ calculated by the disturbance torque estimation unit 64.

The PD control unit 62B calculates feedback control torque $T_{fb,int}$ by performing PD calculation (proportional-derivative calculation) for the angle deviation $\Delta\theta_{c,int}$ calculated by the angle deviation calculation unit 62A. The feedback control torque $T_{fb,int}$ is provided to the torque addition unit 65.

The feedforward control unit 63 is provided to improve control response by compensating for a delay in response due to the inertia of the electric power steering system 1. The feedforward control unit 63 includes an angular acceleration calculation unit 63A and an inertia multiplication unit 63B. The angular acceleration calculation unit 63A calculates a target angular acceleration $d^2\theta^*_{c,int}/dt^2$ by obtaining the second derivative of the integrated angle command value $\theta^*_{c,int}$.

The inertia multiplication unit 63B calculates feedforward control torque $T_{ff,int}$ (=$J \cdot d^2\theta^*_{c,int}/dt^2$) by multiplying the target angular acceleration $d^2\theta_{c,int}/dt^2$ calculated by the angular acceleration calculation unit 63A by an inertia J of the electric power steering system 1. The inertia J is obtained from, for example, a physical model (see FIG. 7) of the electric power steering system 1 described later. The feedforward control torque $T_{ff,int}$ is provided to the torque addition unit 65 as an inertia compensation value.

The torque addition unit 65 calculates a basic torque command value ($T_{fb,int}+T_{ff,int}$) by adding the feedforward control torque $T_{ff,int}$ to the feedback control torque $T_{fb,int}$.

The disturbance torque estimation unit 64 is provided to estimate non-linear torque (disturbance torque: torque other than the motor torque) that is generated as disturbance in a plant (object to be controlled by the electric motor 18). The disturbance torque estimation unit 64 estimates the disturbance torque (disturbance load) $T_{lc}$, the steering angle $\theta_{c,int}$, and a steering angle differential value (angular velocity) $d\theta_{c,int}/dt$ based on the output shaft torque command value $T^*_{c,int}$ (=$N \cdot T^*_{m,int}$) that is an input value to the plant and the actual steering angle $\theta_{c,int}$ that is an output of the plant. The estimated values of the disturbance torque $T_{lc}$, the steering angle $\theta_{c,int}$, and the steering angle differential value (angular velocity) $d\theta_{c,int}/dt$ are represented by $\hat{T}_{lc}$, $\hat{\theta}_{c,int}$, and $d\hat{\theta}_{c,int}/dt$, respectively. The disturbance torque estimation unit 64 will be described in detail later.

The estimated disturbance torque value $\hat{T}_{lc}$ calculated by the disturbance torque estimation unit 64 is provided to the disturbance torque compensation unit 66 as a disturbance torque compensation value.

The disturbance torque compensation unit 66 calculates the output shaft torque command value $T^*_{c,int}$ (=$T_{fb,int}+T_{ff,int}-\hat{T}_{lc}$) by subtracting the estimated disturbance torque value $\hat{T}_{lc}$ from the basic torque command value ($T_{fb,int}+T_{ff,int}$). The output shaft torque command value $T^*_{c,int}$ (torque command value for the output shaft 9) with the disturbance torque compensated for is thus obtained.

The output shaft torque command value $T^*_{c,int}$ is provided to the reduction ratio division unit 67. The reduction ratio division unit 67 calculates the motor torque command value $T^*_{m,int}$ by dividing the output shaft torque command value $T^*_{c,int}$ by the reduction ratio N. The motor torque command value $T^*_{m,int}$ is provided to the torque control unit 48 (see FIG. 2).

The disturbance torque estimation unit 64 will be described in detail. The disturbance torque estimation unit 64 is a disturbance observer that estimates the disturbance torque $T_{lc}$, the steering angle $\theta_{c,int}$, and the angular velocity $d\theta_{c,int}/dt$ using, for example, a physical model 101 of the electric power steering system 1 shown in FIG. 7.

The physical model 101 includes a plant (example of an object to be driven by the motor) 102 that includes the output shaft 9 and the worm wheel 21 fixed to the output shaft 9. The steering torque $T_{tb}$ is applied from the steering wheel 2 to the plant 102 via the torsion bar 10, and the road load torque $T_{rl}$ is applied from the steered wheel 3 side to the plant 102.

Moreover, the output shaft torque command value $T^*_{c,int}$ (=$N \cdot T^*_{m,int}$) is applied to the plant 102 via the worm gear 20, and the friction torque $T_f$ is applied to the plant 102 due to the friction between the worm wheel 21 and the worm gear 20.

An equation of motion for the inertia of the physical model 101 is given by the following expression (3), where J is the inertia of the plant 102.

[Math. 1]

$$J\ddot{\theta}_{c,\text{int}} = N \cdot T^*_{m,int} + T_{lc} \qquad (3)$$

$$T_{lc} = T_{tb} + T_{rl} + T_f$$

$d^2\theta_{c,int}/dt^2$ is the angular acceleration of the plant 102. N is the reduction ratio of the speed reducer 19. $T_{lc}$ represents the disturbance torque other than the motor torque that is applied to the plant 102. While the disturbance torque $T_{lc}$ is shown as the sum of the steering torque $T_{tb}$, the road load torque $T_{rl}$, and the friction torque $T_f$ in the present embodiment, the disturbance torque $T_{lc}$ actually includes torque other than these.

Figure 7:
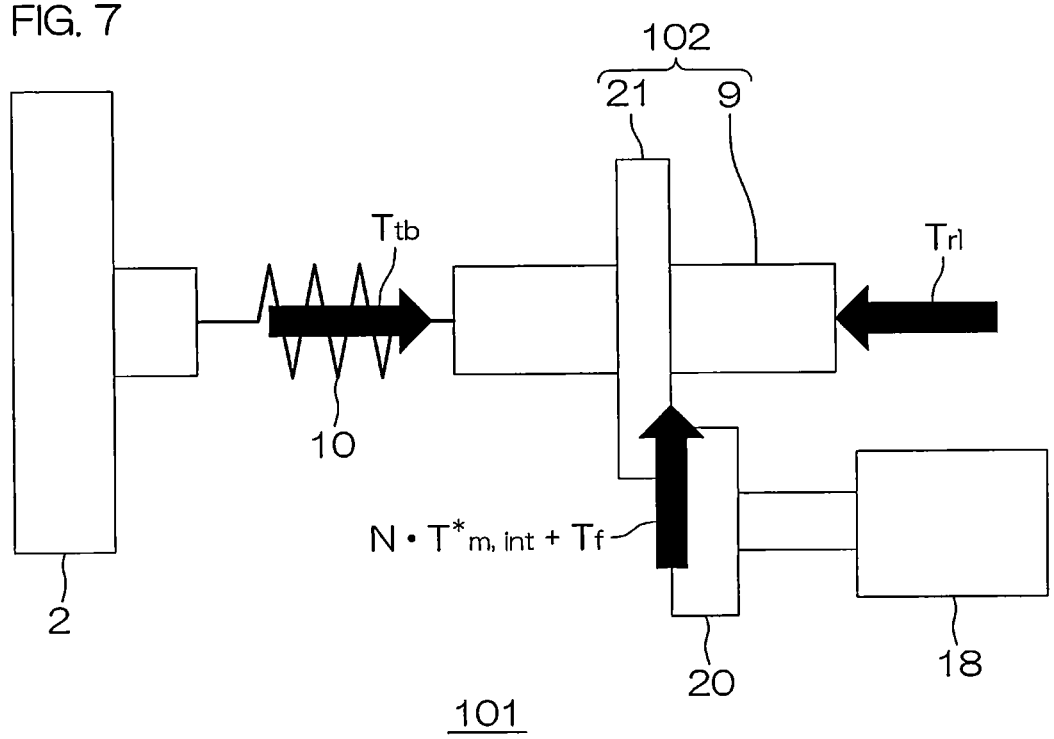
FIG. 7 is a schematic diagram showing an example of the configuration of a physical model of the electric power steering system.

An equation of state for the physical model 101 in FIG. 7 is given by the following expression (4).

[Math. 2]

$$\begin{cases} \dot{x} = Ax + B_1 u_2 + B_2 u_2 \\ y = Cx + Du_1 \end{cases} \qquad (4)$$

In the above expression (4), x is a state variable vector, $u_1$ is a known input vector, $u_2$ is an unknown input vector, and y is an output vector (measured value). In the above expression (4), A is a system matrix, $B_1$ is a first input matrix, $B_2$ is a second input matrix, C is an output matrix, and D is a direct feedthrough matrix.

The above equation of state is extended to a system including the unknown input vector $u_2$ as one of the states. An equation of state of the extended system (extended equation of state) is given by the following expression (5).

[Math. 3]

$$\begin{cases} \dot{X}_e = A_e X_e + B_e u_1 \\ y = C_e X_e \end{cases} \qquad (5)$$

In the above expression (5), $x_e$ is a state variable vector of the extended system, and is given by the following expression (6).

[Math. 4]

$$X_e = \begin{bmatrix} x \\ u_2 \end{bmatrix} \qquad (6)$$

In the above expression (5), $A_e$ is a system matrix of the extended system, $B_e$ is a known input matrix of the extended system, and $C_e$ is an output matrix of the extended system.

A disturbance observer (extended state observer) given by the equation of the following expression (7) is constructed from the extended equation of state given by the above expression (5).

[Math. 5]

$$\begin{cases} \dot{\hat{X}}_e = A_e \hat{X}_e + B_e u_1 + L(y - \hat{y}) \\ \hat{y} = C_e \hat{X}_e \end{cases} \quad (7)$$

In the expression (7), $\hat{x}_e$ represents an estimated value of $x_e$. L is an observer gain. $\hat{y}$ represents an estimated value of y. $\hat{x}_e$ is given by the following expression (8).

[Math. 6]

$$\hat{X}_e = \begin{bmatrix} \hat{\theta}_{c,int} \\ \dot{\hat{\theta}}_{c,int} \\ \hat{T}_{lc} \end{bmatrix} \quad (8)$$

In the expression (8), $\hat{\theta}_{c,int}$ is an estimated value of $\theta_{c,int}$, and $\hat{T}_{lc}$ is an estimated value of $T_{lc}$.

The disturbance torque estimation unit 64 calculates the state variable vector $\hat{x}_e$ based on the equation of the above expression (7).

Figure 8:
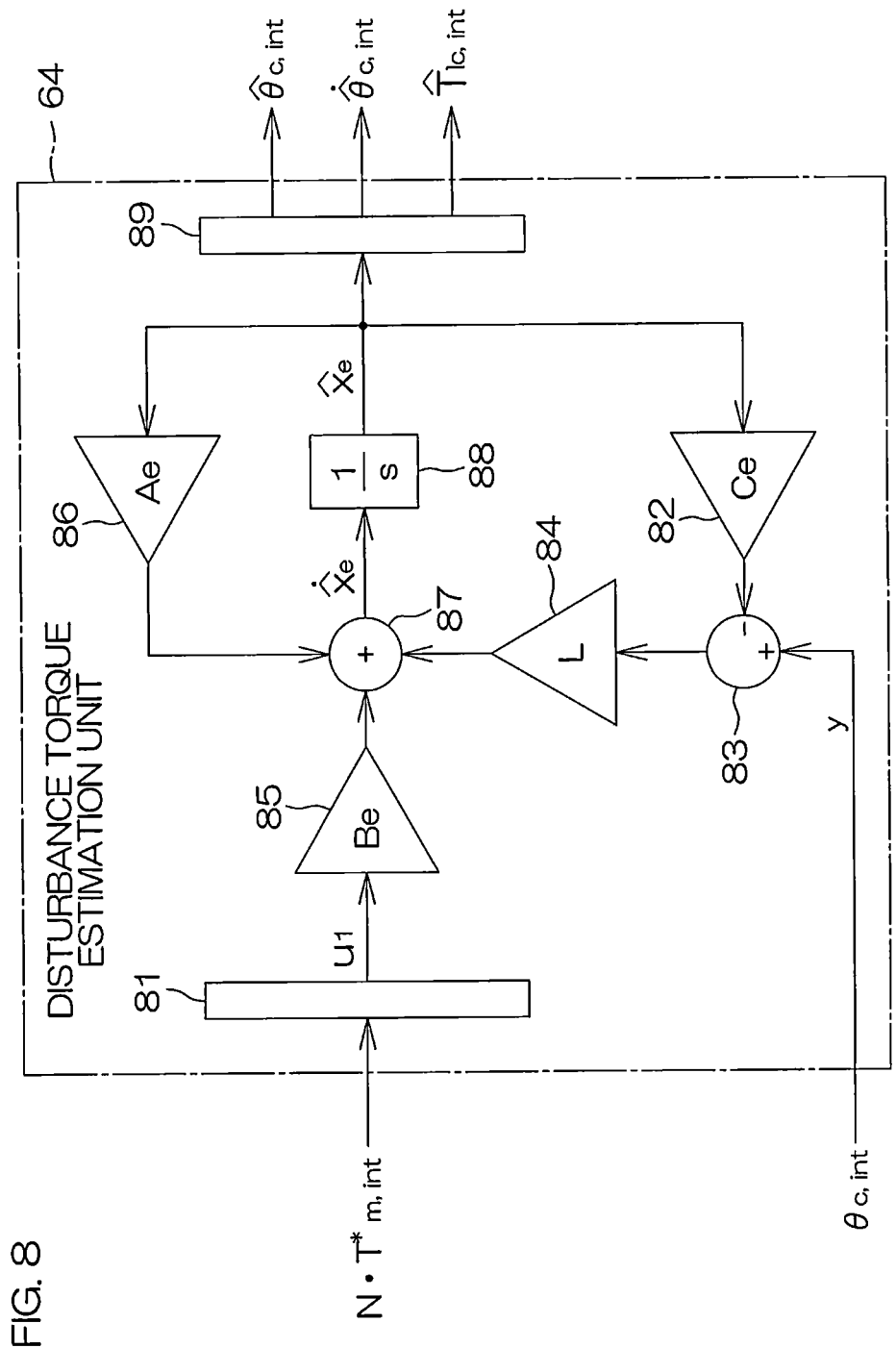
FIG. 8 is a block diagram showing the configuration of a disturbance torque estimation unit.

FIG. 8 is a block diagram showing the configuration of the disturbance torque estimation unit 64.

The disturbance torque estimation unit 64 includes an input vector input unit 81, an output matrix multiplication unit 82, a first addition unit 83, a gain multiplication unit 84, an input matrix multiplication unit 85, a system matrix multiplication unit 86, a second addition unit 87, an integration unit 88, and a state variable vector output unit 89.

The output shaft torque command value $T^*_{c,int}$ ($=N \cdot T^*_{m,int}$) calculated by the reduction ratio multiplication unit 68 (see FIG. 6) is provided to the input vector input unit 81. The input vector input unit 81 outputs the input vector $u_1$.

The output of the integration unit 88 is the state variable vector $\hat{x}_e$ (see the above expression (8)). At the start of the calculation, an initial value is given as the state variable vector $\hat{x}_e$. The initial value of the state variable vector $\hat{x}_e$ is, for example, 0.

The system matrix multiplication unit 86 multiplies the state variable vector $\hat{x}_e$ by the system matrix $A_e$. The output matrix multiplication unit 82 multiplies the state variable vector $\hat{x}_e$ by the output matrix $C_e$.

The first addition unit 83 subtracts the output ($C_e \cdot \hat{x}_e$) of the output matrix multiplication unit 82 from the output vector (measured value) y that is the actual steering angle $\theta_{c,int}$ calculated by the reduction ratio division unit 42 (see FIG. 2). That is, the first addition unit 83 calculates the difference ($y - \hat{y}$) between the output vector y and the estimated output vector value $\hat{y}$ ($=C_e \cdot \hat{x}_e$). The gain multiplication unit 84 multiplies the output ($y - \hat{y}$) of the first addition unit 83 by the observer gain L (see the above expression (7)).

The input matrix multiplication unit 85 multiplies the input vector $u_1$ output from the input vector input unit 81 by the input matrix $B_e$. The second addition unit 87 calculates a derivative value $d\hat{x}_e/dt$ of the state variable vector by adding the output ($B_e \cdot u_1$) of the input matrix multiplication unit 85, the output ($A_e \cdot \hat{x}_e$) of the system matrix multiplication unit 86, and the output ($L(y-\hat{y})$) of the gain multiplication unit 84. The integration unit 88 calculates the state variable vector $\hat{x}_e$ by integrating the output ($d\hat{x}_e/dt$) of the second addition unit 87. The state variable vector output unit 89 calculates the estimated disturbance torque value $\hat{T}_{lc}$, the estimated steering angle value $\hat{\theta}_{c,int}$, and the estimated angular velocity value $d\hat{\theta}_{c,int}/dt$ based on the state variable vector $\hat{x}_e$.

Unlike the extended state observer described above, a typical disturbance observer is composed of an inverse model of the plant and a low-pass filter. An equation of motion of the plant is given by the expression (3) as described above. Thus, the inverse model of the plant is given by the following expression (9).

[Math. 7]

$$T_{lc} = J\ddot{\theta}_{c,int} - N \cdot T^*_{m,int} \quad (9)$$

The inputs to the typical disturbance observer are $J \cdot d^2\theta_{c,int}/dt^2$ and $N \cdot T^*_{m,int}$. Since the second derivative of the actual steering angle $\theta_{c,int}$ is used, noise of the rotational angle sensor 23 has a great influence. On the other hand, the extended state observer according to the embodiment described above estimates the disturbance torque using an integral type. Therefore, the influence of noise due to differentiation can be reduced.

The typical disturbance observer composed of the inverse model of the plant and the low-pass filter may be used as the disturbance torque estimation unit 64.

Figure 9:
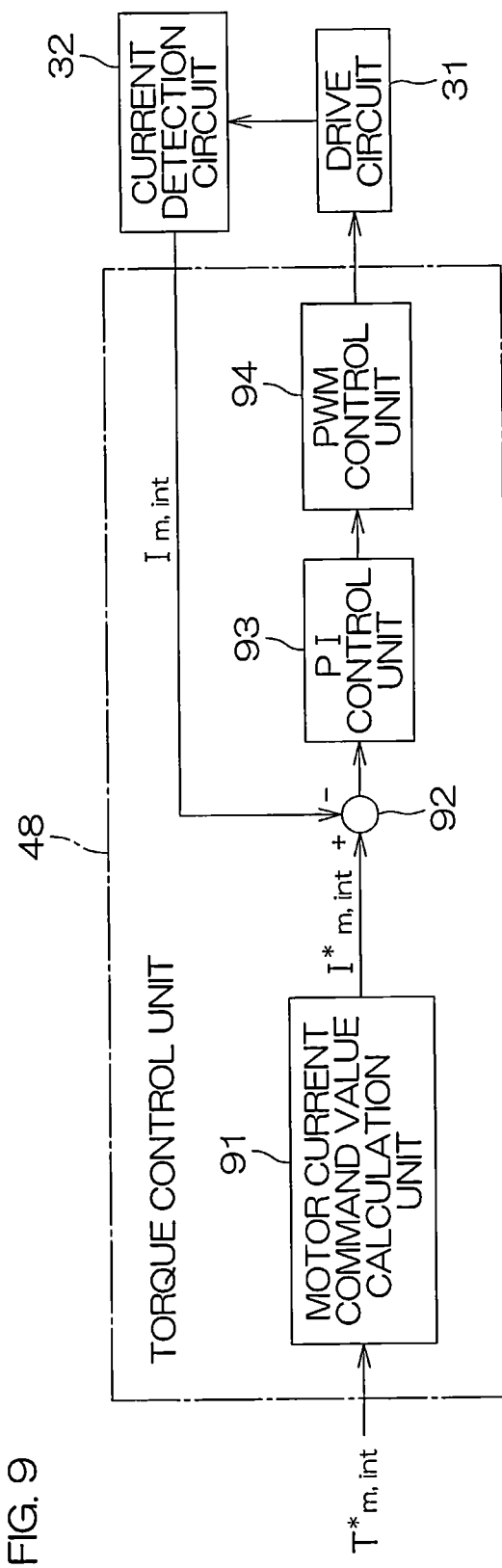
FIG. 9 is a schematic diagram showing the configuration of a torque control unit.

FIG. 9 is a block diagram showing the electrical configuration of the torque control unit 48. The torque control unit 48 includes a motor current command value calculation unit 91, a current deviation calculation unit 92, a PI control unit 93, and a PWM (Pulse Width Modulation) control unit 94.

The motor current command value calculation unit 91 calculates a motor current command value $I^*_{m,int}$ by dividing the motor torque command value $T^*_{m,int}$ calculated by the angle control unit 47 by a torque constant $K_t$ of the electric motor 18.

The current deviation calculation unit 92 calculates a deviation $\Delta I_{m,int}$ ($=I^*_{m,int}-I_{m,int}$) between the motor current command value $I^*_{m,int}$ obtained by the motor current command value calculation unit 91 and the motor current $I_{m,int}$ detected by the current detection circuit 32.

The PI control unit 93 generates a drive command value for controlling the motor current $I_{m,int}$ flowing through the electric motor 18 to the motor current command value $I^*_{m,int}$ by performing PI calculation (proportional-integral calculation) for the current deviation $\Delta I_{m,int}$ calculated by the current deviation calculation unit 92. The PWM control unit 94 generates a PWM control signal with a duty cycle corresponding to the drive command value, and supplies the PWM control signal to the drive circuit 31. Electric power corresponding to the drive command value is thus supplied to the electric motor 18.

Next, the operation of the coefficient value setting unit 44 will be described in detail. The coefficient value setting unit 44 performs a coefficient value setting process for setting the lower column inertia $J_c$, the spring constant k, and the viscous damping coefficient c in the autonomous driving mode.

Figure 10:
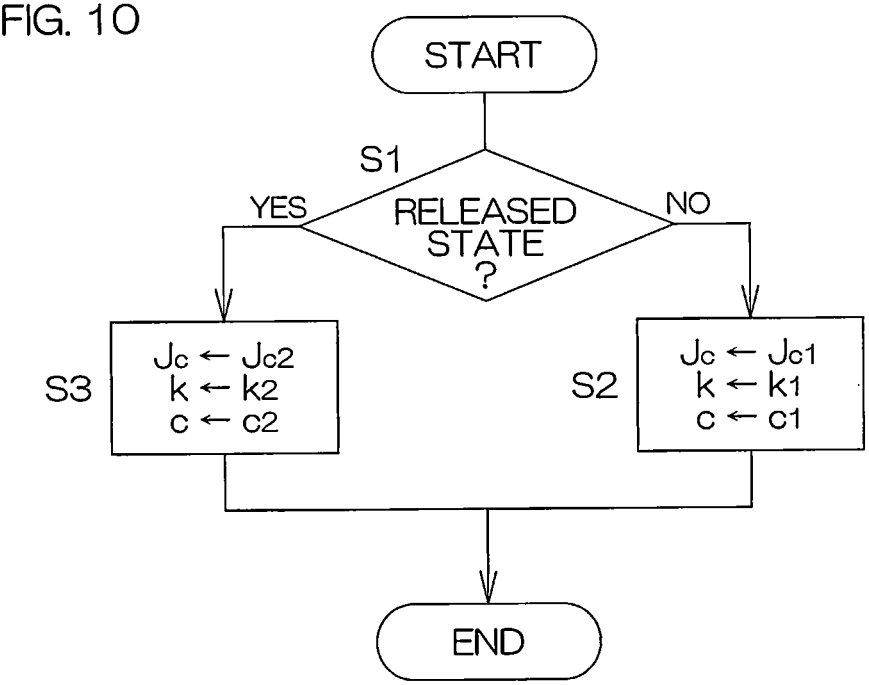
FIG. 10 is a flowchart showing the procedure of a coefficient value setting process performed by a coefficient value setting unit.

FIG. 10 is a flowchart showing the procedure of the coefficient value setting process performed by the coefficient value setting unit 44. The coefficient value setting process shown in FIG. 10 is started every time the autonomous driving mode is started, and is repeatedly performed at every predetermined calculation cycle until the autonomous driving mode is terminated.

In the following, $J_{c1}$, $k_1$, and $c_1$ are the lower column inertia $J_c$, the spring constant k, and the viscous damping coefficient c, respectively, for designing a reaction force characteristic during steering intervention. $J_{c2}$, $k_2$, and $c_2$ are the lower column inertia $J_c$, the spring constant k, and the viscous damping coefficient c, respectively, for designing a return characteristic after the steering wheel is released. $J_{c1}$, $k_1$, and $c_1$ and $J_{c2}$, $k_2$, and $c_2$ are preset and stored in the memory.

In the initial settings when the power is turned on, it is assumed that the coefficient value setting unit 44 sets $J_{c1}$, $k_1$, and $c_1$ as the lower column inertia $J_c$, the spring constant k, and the viscous damping coefficient c, respectively.

The coefficient value setting unit 44 determines whether the determination result from the hands-on/off determination unit 43 shows the released state (step S1).

When the determination result from the hands-on/off determination unit 43 shows the gripping state (e.g., the steering torque $T_{tb}$ is equal to or greater than the predetermined threshold value) (step S1: NO), the coefficient value setting unit 44 sets $J_{c1}$, $k_1$, and $c_1$ as the lower column inertia $J_c$, the spring constant k, and the viscous damping coefficient c, respectively (step S2). Then, the process in the current calculation cycle ends.

If $J_{c2}$, $k_2$, and $c_2$ have been set as the lower column inertia $J_c$, the spring constant k, and the viscous damping coefficient c, respectively, at the time of proceeding to step S2, the coefficient value setting unit 44 may switch $J_{c2}$, $k_2$, and $c_2$ to $J_{c1}$, $k_1$, and $c_1$, respectively, by gradually bringing $J_{c2}$, $k_2$, and $c_2$ closer to $J_{c1}$, $k_1$, and $c_1$, respectively, over a time of about 0.5 seconds to 1 second. In this case, $J_{c2}$, $k_2$, and $c_2$ are switched to $J_{c1}$, $k_1$, and $c_1$, respectively, after a plurality of calculation cycles.

As a method not limited to the elapsed time, in a case where the hands-on/off determination unit 43 is, as described above, a hands-on/off determination unit that determines hands-on when the steering torque $T_{tb}$ is equal to or greater than the first threshold value (e.g., 1 Nm) and determines hands-off when the steering torque $T_{tb}$ is equal to or smaller than the second threshold value (e.g., 0.5 Nm) different from the first threshold value, the coefficient value setting unit 44 may switch the coefficient values as follows. That is, the coefficient value setting unit 44 gradually brings $J_{c2}$, $k_2$, and $c_2$ closer to $J_{c1}$, $k_1$, and $c_1$, respectively, from the time when the steering torque $T_{tb}$ has exceeded the second threshold value. When the steering torque $T_{tb}$ has then reached the first threshold value, the coefficient value setting unit 44 sets $J_{c1}$, $k_1$, and $c_1$ as the lower column inertia $J_c$, the spring constant k, and the viscous damping coefficient c, respectively.

When the determination result from the hands-on/off determination unit 43 shows the released state in step S1 (e.g., the steering torque $T_{tb}$ continues to be smaller than the threshold value for the predetermined time or longer) (step S1: YES), $J_{c2}$, $k_2$, and $c_2$ are set as the lower column inertia $J_c$, the spring constant k, and the viscous damping coefficient c, respectively (step S3). Then, the process in the current calculation cycle ends.

If $J_{c1}$, $k_1$, and $c_1$ have been set as the lower column inertia $J_c$, the spring constant k, and the viscous damping coefficient c, respectively, at the time of proceeding to step S3, the coefficient value setting unit 44 may switch $J_{c1}$, $k_1$, and $c_1$ to $J_{c2}$, $k_2$, and $c_2$, respectively, by gradually bringing $J_{c1}$, $k_1$, and $c_1$ closer to $J_{c2}$, $k_2$, and $c_2$, respectively, over a time of about 0.5 seconds to 1 second. In this case, $J_{c1}$, $k_1$, and $c_1$ are switched to $J_{c2}$, $k_2$, and $c_2$, respectively, after a plurality of calculation cycles.

As a method not limited to the elapsed time, in a case where the hands-on/off determination unit 43 is, as described above, a hands-on/off determination unit that determines hands-on when the steering torque $T_{tb}$ is equal to or greater than the first threshold value (e.g., 1 Nm) and determines hands-off when the steering torque $T_{tb}$ is equal to or smaller than the second threshold value (e.g., 0.5 Nm) different from the first threshold value, the coefficient value setting unit 44 may switch the coefficient values as follows. That is, the coefficient value setting unit 44 gradually brings $J_{c1}$, $k_1$, and $c_1$ closer to $J_{c2}$, $k_2$, and $c_2$, respectively, from the time when the steering torque $T_{tb}$ has fallen below the first threshold value. When the steering torque $T_{tb}$ has then reached the second threshold value, the coefficient value setting unit 44 sets $J_{c2}$, $k_2$, and $c_2$ as the lower column inertia $J_c$, the spring constant k, and the viscous damping coefficient c, respectively.

When the driving mode is the normal mode, the coefficient value setting unit 44 sets $J_{c1}$, $k_1$, and $c_1$ as the lower column inertia $J_c$, the spring constant k, and the viscous damping coefficient c, respectively. That is, in the normal mode, the lower column inertia $J_c$, the spring constant k, and the viscous damping coefficient c are not changed.

For example, $J_{c2}$, $k_2$, and $c_2$ are set as follows relative to $J_{c1}$, $k_1$, and $c_1$, respectively. For example, it is assumed that, if the reaction force characteristic during steering intervention is used directly as the return characteristic after the steering wheel is released (characteristic that the manual steering command value $\theta^*_{c,md}$ converges on zero), the return characteristic after the steering wheel is released is quick and the vehicle has an unnecessary lateral acceleration to give a sense of anxiety to the driver. In such a case, $J_{c2}$ is set greater than $J_{c1}$, $k_2$ is set smaller than $k_1$, or $c_2$ is set greater than $c_1$.

Figure 11:
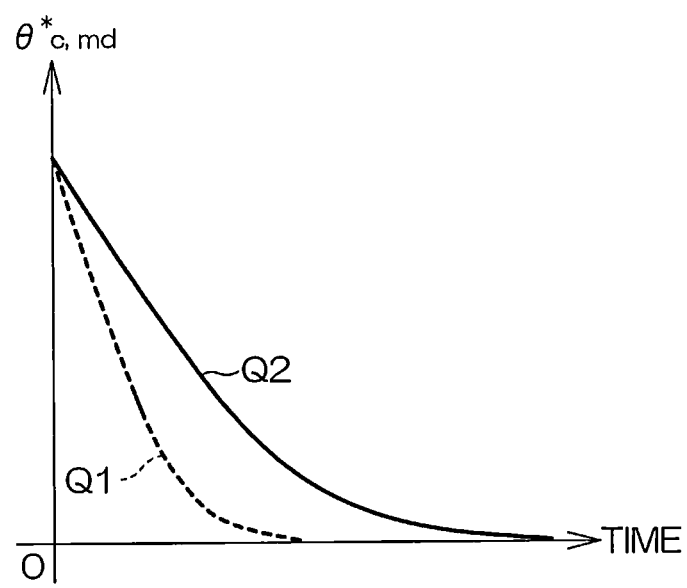
FIG. 11 is a graph showing an example of a return characteristic when a reaction force characteristic during steering intervention is used directly as a return characteristic after a steering wheel is released, and a return characteristic when $k_2$ is set smaller than $k_1$.

A dashed line Q1 in FIG. 11 shows the return characteristic when the reaction force characteristic during steering intervention is used directly as the return characteristic after the steering wheel is released, and a continuous line Q2 in FIG. 11 shows the return characteristic when $k_2$ is set smaller than $k_1$. When $k_2$ is set smaller than $k_1$, the manual steering command value $\theta^*_{c,md}$ converges on zero slowly.

In the autonomous driving mode, the coefficient value setting unit 44 may change all of the lower column inertia $J_c$, the spring constant k, and the viscous damping coefficient c based on the hands-on/off determination result, or may change any one of or a combination of any two of the lower column inertia $J_c$, the spring constant k, and the viscous damping coefficient c. That is, the coefficient value setting unit 44 only needs to change at least one of the lower column inertia $J_c$, the spring constant k, and the viscous damping coefficient c based on the hands-on/off determination result.

In the embodiment described above, in the autonomous driving mode, at least one value out of the lower column inertia $J_c$, the spring constant k, and the viscous damping coefficient c can be changed based on the determination result from the hands-on/off determination unit 43. Thus, it is possible to individually set the reaction force characteristic during the steering intervention and the return characteristic after the steering wheel is released.

The embodiment described above illustrates the example in which the present invention is applied to motor control for a column type EPS. However, the present invention is also applicable to motor control for an EPS other than the column type.

Although the embodiment of the present invention is described in detail above, this is merely a specific example used to clarify the technical content of the present invention, and the present invention should not be construed as being limited to the specific example, and the scope of the present invention is limited only by the appended claims.

DESCRIPTION OF THE REFERENCE NUMERALS

1 . . . electric power steering system, 3 . . . steered wheel, 4 . . . steering operation mechanism, 18 . . . electric motor, 43 . . . hands-on/off determination unit, 44 . . . coefficient value setting unit, 45 . . . manual steering command value generation unit, 46 . . . integrated angle command value calculation unit, 47 . . . angle control unit, 48 . . . torque control unit, 51 . . . assist torque command value setting unit, 52 . . . command value setting unit, 201 . . . higher-level ECU, 202 . . . motor control ECU

The invention claimed is:

1. A motor control device comprising:
a manual steering command value generation unit that generates a manual steering command value;
an integrated angle command value calculation unit that calculates an integrated angle command value by adding the manual steering command value to an automatic steering command value provided in an autonomous driving mode;
a control unit that performs angle control on an electric motor for steering angle control based on the integrated angle command value; and
a hands-on/off determination unit that determines whether a driver is in a gripping state in which the driver is gripping a steering wheel or in a released state in which the driver is not gripping the steering wheel, wherein
the manual steering command value generation unit is configured to generate the manual steering command value based on an equation of motion, and the motor control device further includes a coefficient value changing unit that changes a value of at least one coefficient among coefficients included in the equation of motion based on a determination result from the hands-on/off determination unit.

2. The motor control device according to claim 1, wherein:
the equation of motion includes inertia, a spring constant, and a viscous damping coefficient as the coefficients; and
the coefficient value changing unit is configured to change a value of at least one of the inertia, the spring constant, and the viscous damping coefficient based on the determination result from the hands-on/off determination unit.

3. The motor control device according to claim 1, wherein the hands-on/off determination unit is configured to determine that the driver is in the gripping state when a steering torque is equal to or greater than a predetermined threshold value, and determine that the driver is in the released state when the steering torque continues to be smaller than the threshold value for a predetermined time or longer.

* * * * *